United States Patent [19]
Fraden

[11] Patent Number: 6,152,596
[45] Date of Patent: Nov. 28, 2000

[54] PROTECTIVE COVER FOR INFRARED THERMOMETER

[75] Inventor: Jacob Fraden, La Jolla, Calif.

[73] Assignee: Advanced Monitors Corporation, San Diego, Calif.

[21] Appl. No.: 09/109,449

[22] Filed: Jul. 2, 1998

[51] Int. Cl.[7] .............................. G02K 5/22; A61B 6/00
[52] U.S. Cl. ........................ 374/158; 600/186; 600/200; 600/203; 600/184; 600/549; 600/474
[58] Field of Search ........................... 374/158; 600/121, 600/184, 186, 201, 203, 200, 555, 549, 438, 474

[56] References Cited

U.S. PATENT DOCUMENTS

| | | | |
|---|---|---|---|
| 3,841,317 | 10/1974 | Awais | 128/17 |
| 3,949,740 | 4/1976 | Twentier | 128/9 |
| 4,159,766 | 7/1979 | Kluge | 206/306 |
| 4,662,360 | 5/1987 | O'Hara et al. | 374/158 |
| 4,863,281 | 9/1989 | Suszynski | 374/158 |
| 4,911,559 | 3/1990 | Meyst et al. | 374/158 |
| 5,088,834 | 2/1992 | Howe et al. | 374/158 |
| 5,325,846 | 7/1994 | Szabo | 128/4 |
| 5,588,748 | 12/1996 | Nomura et al. | 374/158 |
| 5,795,067 | 8/1998 | Fraden et al. | 374/158 |
| 5,833,367 | 11/1998 | Cheslock et al. | 374/158 |
| 5,906,437 | 5/1999 | Lin | 374/158 |
| 5,935,058 | 8/1999 | Makita et al. | 600/200 |
| 6,007,482 | 12/1999 | Madni et al. | 600/115 |
| 6,022,140 | 2/2000 | Fraden et al. | 374/158 |
| 6,042,266 | 3/2000 | Cheslock et al. | 374/158 |

FOREIGN PATENT DOCUMENTS

| | | |
|---|---|---|
| 0445784 | 9/1991 | European Pat. Off. . |
| 0472490A1 | 2/1992 | European Pat. Off. ............ 374/158 |
| WO 97/42475 | 11/1997 | WIPO . |

*Primary Examiner*—G. Bradley Bennett
*Assistant Examiner*—G. Verbitsky
*Attorney, Agent, or Firm*—Baker & Maxham

[57] ABSTRACT

A probe cover for an infrared (IR) thermometer having two distinct portions, one which is substantially rigid, and the other which is stretchable by at least two times to envelop the probe of the IR thermometer. The stretchable portion allows IR radiation to pass toward the optical window of the IR thermometer probe. The rigid portion of the probe cover is engaged with the probe during the installation process.

5 Claims, 3 Drawing Sheets

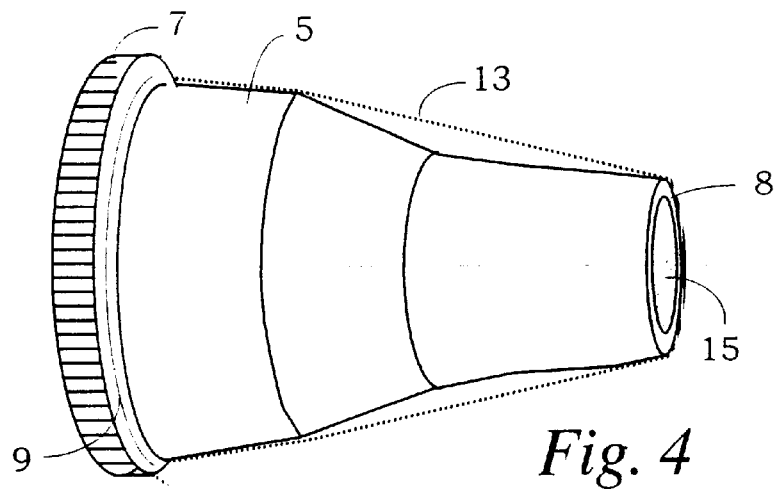
*Fig. 4*
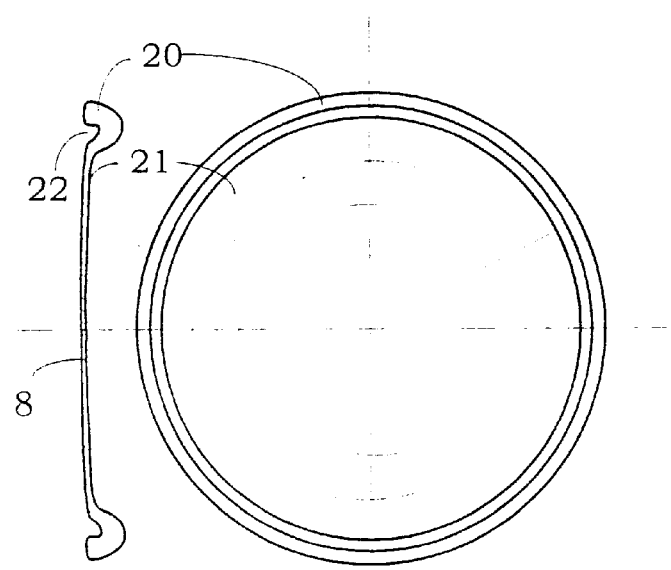
*Fig. 5A*  *Fig. 5B*

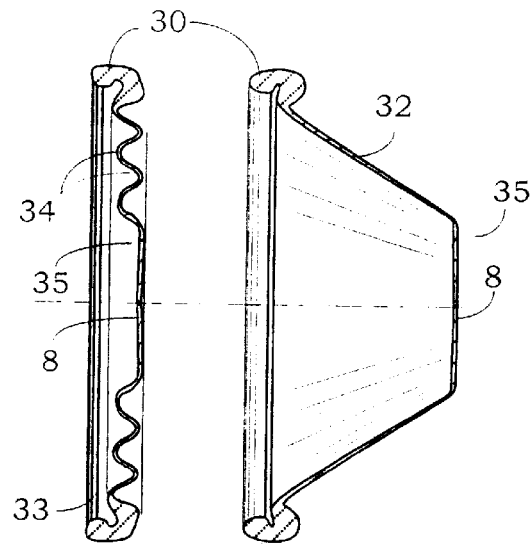
*Fig. 6A*  *Fig. 6B*
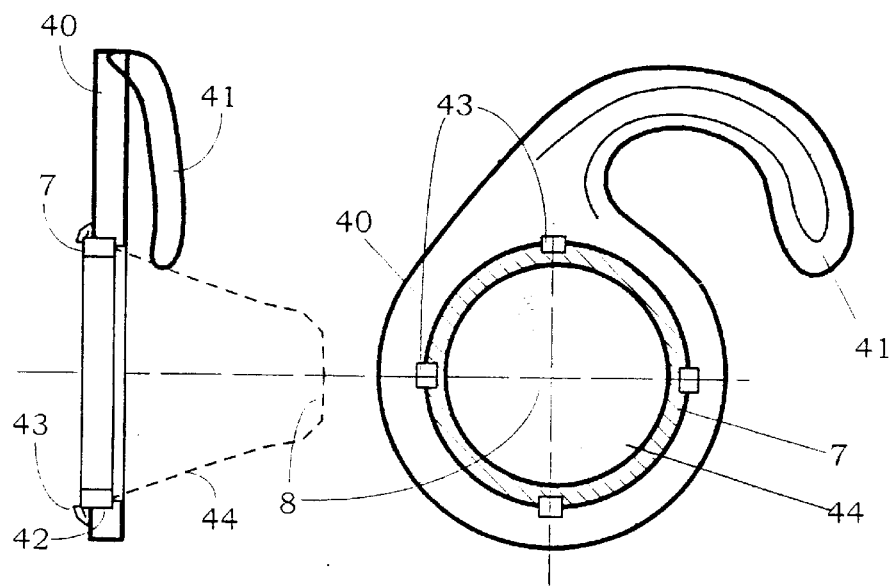
*Fig. 7A*  *Fig. 7B*

PROTECTIVE COVER FOR INFRARED THERMOMETER

BACKGROUND OF THE INVENTION

1. Field of the Invention

The present invention relates generally to infrared thermometers. More specifically, it relates to the probe cover portion of an infrared thermometer, commonly known as ear or tympanic or ear thermometer.

2. Description of Prior Art

Temperature of an object, specifically, of a human or animal, can be measured by the means of thermal conduction or, alternatively, by means of thermal radiation. In the latter case, naturally emanated electromagnetic radiation in the far infrared spectral range is detected by an appropriate sensor, whose output signal is indicative of the surface temperature of an object. A combination of a sensor, electronic circuit and other components form an infrared (IR) thermometer, which is an opto-electronic instrument.

Human or animal body temperature can be measured by placing an optical probe of an IR thermometer into the ear canal or other body cavity.

Nearly all traditional medical contact thermometers, for example, oral or rectal, use the sanitary probe covers. Term "traditional" above and hereafter means contact, non-infrared thermometers and accessories, such as probe covers. In a traditional probe cover, thermal energy (heat) is transmitted by means of thermal conduction, thus, requirements to a probe cover shall comply with the thermally conductive properties of the probe cover material. Various conventional covers for such contact thermometers are described in many patents, for example, in U.S. Pat. No. 4,159,766 issued to Kluge.

For measuring surface temperature of an object without a physical contact, the IR probe is aimed at the area of interest. In medical applications, to measure temperature of a tympanic membrane and the surrounding tissues, the probe is placed into the ear canal. Before the insertion, a probe cover is installed onto the probe to envelop such parts that otherwise might come in contact with the object tissues. The cover shall not only provide a sanitary protection against contamination of the IR probe by ear wax and other soiling compounds, but also it shall possess properties which are critical for the accurate temperature measurement by means of detecting infrared signal. These properties include a good transparency of the front portion of the probe cover in the spectral range of interest (generally, 3 to 15 micrometers), low directional distortion of optical rays, tight manufacturing tolerances, stability of the optical properties during installation onto the probe, long term stability, etc.

As a rule, any prior art IR probe cover employed a thin polymer membrane or film at its optical end (thickness ranging from as little as 0.0005 to as much as 0.0051). The IR radiation has to pass through that membrane before entering the probe and being detected by the IR sensor. In effect, such a probe cover works as an optical filter. Typical materials for fabricating the probe covers are polyethylene, polypropylene, and the copolymers of the above.

Several ways of making the probe covers for the IR medial thermometers are known in art. Generally, all such covers can be divided into two types:

1. The probe covers whose shape is defined during the manufacturing process and remain substantially unchanged while installed onto an IR probe, and
2. The probe covers whose shape is substantially modified during the installation onto the IR probe.

The 1st type is exemplified by U.S. Pat. Nos. 4,662,360, 5,293,862 and 5,179,936 issued to O'Hara et al. which describe a tubular body of the probe cover with a bonded membrane where the tubular body may be injection molded. The tubular body is made of a pliant plastic material. When installed on the IR thermometer probe, the membrane is stressed tight to smooth out the wrinkles. Another examples of the 1st type is the probe covers described in U.S. Pat. No. 5,088,834 issued to Howe and Brown and U.S. Pat. No. 5,163,418 issued to Fraden et al.

The 2nd type of a probe cover is exemplified by U.S. Pat. No. 4,911,559 issued to Meist and Suszinski, which describes a probe cover having a flat polymer film laminated with backing materials. The film stretches around the probe during the installation, thus taking its shape.

Another example of a probe cover is U.S. Pat. No. 5,609,564 issued to Makita et al. where the cover is formed of two layers of film and the positioning ring. The films change shape while enveloping the IR probe during the installation process. U.S. Pat. No. 5,645,350 issued to Jang teaches a wrapping film which is secured on the probe by a fastening cup.

To prevent reuse of a probe cover, Twentier in U.S. Pat. No. 3,878,836 teaches a probe cover ("speculum") having a stretchable portion near the tip which cracks during the installation, thus it can't be reused.

The 1st type of probe covers may suffer from several drawbacks. For examples, the pre-shaped probe covers occupy more space in storage and shall be produced with tight tolerances to minimize negative effects of interaction with the IR probe (such as excessive stretching, tearing of the film, etc.).

Since many probe covers of the 2nd type are fabricated in pliable or flexible shapes or they are laminated with layers of very pliant materials (paper, i.e.), they are more difficult to handle by the user and often require special fixtures or mechanisms for loading onto the IR probe.

Thus, it is an object of the present invention to provide a sanitary barrier between the IR probe and surface of the ear canal.

Another object of the invention is a probe cover which is less sensitive to the manufacturing tolerances.

It is a further object of this invention to provide a probe cover which occupies less space during storage.

It is another object of this invention to provide a probe cover which is less likely to break during the installation.

And the other object of this invention is to provide a probe cover which is easy to install onto the IR probe.

SUMMARY OF THE INVENTION

The objects of this invention are attained by combining in a probe cover a substantially rigid support portion with a highly stretchable polymer film enveloping the IR probe. The new probe cover contains two distinct portions: one is a pre-shaped support portion which retains its shape during the installation, and the other is the stretchable film whose shape changes substantially to conform to the probe body profile.

SHORT DESCRIPTION OF DRAWINGS

FIG. 4 is a view of a probe cover installed onto the probe

FIGS. 5A and 5B depict a unitary probe cover with flat membrane

FIGS. 6A and 6B depict a unitary probe cover with a corrugated membrane

FIGS. 7A and 7B shows a probe cover installed into a clamp.

DETAILED DESCRIPTION OF PREFERRED EMBODIMENT

A probe cover for an infrared thermometer is a sanitary envelope which forms a barrier between the instrument and the patient. In this description we exemplify probe covers for an infrared thermometer for taking temperature from an ear canal of a human or animal. The identical covers are applicable for taking measurements from any other body cavity or surface of a human or animal. These may include an anal opening, a sublingual cavity, axillary (under-the-armpit) cavity, etc. The material for the probe cover's front end, that is, for its optical portion, is selected from the group of polymers which have significant transparency in the spectral range between 3 and 15 μm. Examples are polyethylene, polypropylene, and copolymers of such. As a rule, thickness of the optical portion of the cover is on the order of 20 micrometers. This assures a reasonable compromise between an acceptable IR transmission and mechanical strength.

Figure 1:
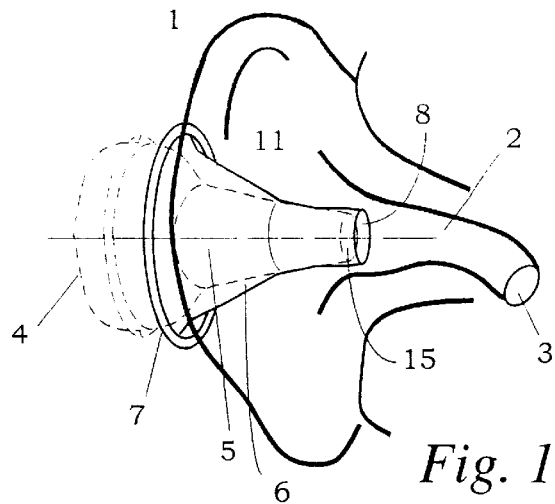
FIG. 1 shows a prior art probe cover attached to the probe of an infrared thermometer and inserted into a human ear canal.

FIG. 1 shows an infrared (IR) thermometer 4. Its probe 5 may house an infrared sensor, whose function is to detect thermal radiation from ear canal 2 of patient's ear 1. The end of ear canal 2 is terminated by tympanic membrane 3 whose temperature is close to that of the interior of a patient's body. Probe cover 11 is positioned over probe 5 in such a manner as to make nearly impossible any physical contact between probe 5 and any part of the patient body, specifically ear canal 2.

In general, an IR probe cover consists of three portions to perform three distinct functions: retention, enveloping, and optical. These three portions are: a support portion 7 for connecting the probe cover to IR thermometer 4 and retaining it on probe 5 during the measurement, an enveloping portion 6 to cover the body of probe 5, and an optical portion forming membrane 8 which is the front end of the cover. The membrane possess the optical and thermal properties essential for the accurate temperature measurement by allowing passage of infrared energy into window 15 of probe 5. The probe cover the present invention is fabricated to perform all three function. The retention functions is performed by using a substantially rigid support portion, while the enveloping and optical functions are performed by a highly stretchable polymer film.

Figure 2:
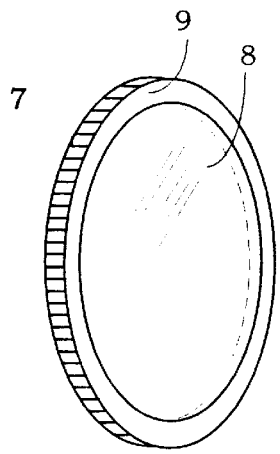
FIG. 2 depicts a probe cover with a ring base

FIG. 2 shows the simplest embodiment of this invention. It consists of a rigid support 7 whose opening is covered by a polymer film 8 which is attached to support 7 at it's surface 9. The support is comparatively rigid to substantially retain its shape while being installed onto the IR probe. It may be fabricated of a variety of plastic materials, such a polyethylene, polypropylene, ABS, etc. Coloring dies may be added to the plastic to give the ring aesthetic and identifying distinctive appearance. A combination of the support and the film forms a tympanum.

Polymer film 8 is selected of a group of polyethylene, polypropylene, or copolymers of such with the appropriate molecular structure to allow the film to stretch bi-axially by at least two times without breaking. To assure sufficient transparency to thermal radiation and maintain physical strength, the film thickness needs to be selected between 8 and 25 micrometers. The film may be attached to the support means by many methods known in art. The most appropriate and economical is thermal welding, followed by ultrasonic welding and mechanical clamping. In the latter case, support means may consists of more than one part which are joined together to clamp the peripheral areas of film 8 (not shown). Alternatively, the film may be produced as a continuous extension of support 7, as it is described below.

Figure 3:
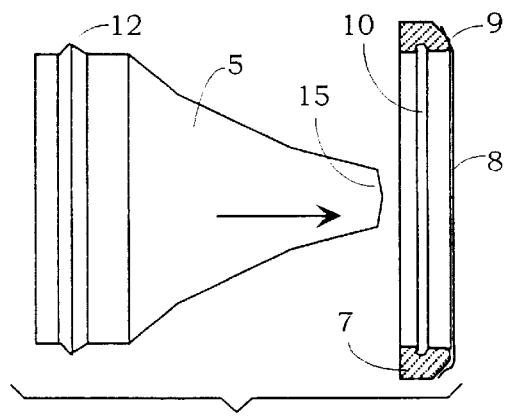
FIG. 3 is a cross-sectional view of the ring base

During the probe cover installation process, support 7 engages with the IR probe to hold the probe cover on the probe during the temperature measurement. The support needs to have a profile corresponding to the shape of probe 5 for the coaxial alignment with the probe and may incorporate some elements for better engagement with the probe. FIG. 3 depicts a cross-sectional view of the probe cover. Support 7 has a circular shape and contains groove 10 for engagement with the corresponding bump 12 of IR probe 5. Naturally, support 7 does not need to be circular. It's shape should be selected to correspond to the probe profile and to the shape of the storage and dispensing equipment. To install the probe cover onto probe 5, front window 15 of probe 5 needs to be positioned approximately near the central portion of film 8. Then, probe 5 is moved into direction identified by an arrow in FIG. 3 until the groove snaps on retention bump 12. If support 7 is relatively thin (in the range of 1 mm), groove 10 may not be needed as bump 12 will pass through the opening in support 7 and snap near area 9 where the film is attached to support 7. When front end of probe 5 (near window 15) is engaged with film 8 and keeps moving through the opening in support 7, this action forces film 8 to stretch resulting in enveloping the outer surface of probe 5 and conforming to it profile. When support 7 snaps on the probe's bump 12, the installation is complete. FIG. 4 shows the installed probe cover where the film is stretched to form envelope 13 to protect the surface of probe 5. Being substantially transparent in the mid and far infrared spectral ranges, film 8 allows thermal radiation to pass with minimal loss toward window 15.

Other Embodiments

The above described fabricating methods assumes usage of a separately produced film which is bonded one way or another to the support means. There are numerous other ways to attain the design goal. An example of an alternative way to form the film and the support means is by using a manufacturing process where the entire probe cover is fabricated as a unitary device. FIGS. 5A and 5B show ring 20 and film 8 as a continuous extension of one another where the film is just a decreased thickness of the material. Engaging groove 22 may formed by the same process which may include thermoforming, injection molding, casting and other technologies known in art. Some technologies may not be suitable to produce film 8 which has enough stretching capability without breakage. To aid in elongation of film 8 during the installation process, its shape may be prefabricated in a corrugated manner as shown in FIGS. 6A and 6B. In this embodiment, ring 30 supports folds 34 of film 8. Central portion 35 of the film is not corrugated. Its generally flat profile is retained to protect the optical properties of the area where infrared radiation need to pass to the window. During the installation, folds 34 unfold (FIG. 6B) thus forming envelope 32 which covers the IR probe.

In some applications, it may be desirable to support the IR probe with the installed probe cover on a patient's body for a continuous monitoring of body temperature. An example of such an arrangement is shown in FIGS. 7A and 7B. wherein probe cover 45 is made as an insert 44 that is installed into holder 40. Thus the holder carries the IR probe (not shown) and insert 44 in a mutually engaged position. Holder 40 may have an extension in a form of clip 41 for better attachment to the patients body. Shape of clip 41 that is shown in FIG. 7B is adapted for circumventing a helix of a human ear for securing the probe with a probe cover inside the patient's ear canal. Naturally, other shapes of the clip can be employed for attaching to other body cavities. Also, clip 41 may have some additional components for better retention on the patient ear or the clothing. Examples are clamps, wire guides, etc. Such components are beyond the scope of this invention and not further described here.

In the embodiment shown in FIG. 7, support 7 of the probe cover is inserted into opening 42 of holder 40. It is retained in place by protruding locks 43. There may be more than one such lock. The locks may be positioned on one or both sides of holder 40 (shown are only left-side locks) for ease of installation of the probe cover either from left or right side of opening 42. This may be desirable when the same holder 40 with clip 41 is used either on right or left ear of a patient. In other embodiments, support 7 may be a continuous part of holder 40, so that both are fabricated as a unitary device.

Although preferred embodiments of the invention have been disclosed herein in detail, it is to be understood that this is for the purpose of illustrating the invention, and should not be construed as necessarily limiting the scope of the invention since it is apparent that many changes can be made by those skilled in the art while still practicing the invention claimed herein.

What is claimed is:

1. A probe cover for use with an infrared thermometer comprising a probe having a tip to be placed adjacent a body, said tip comprising a window to receive radiation for measuring the temperature of the body, said probe cover being adapted to substantially prevent contact between the body and said probe while allowing radiation to be transmitted through said window to a sensor forming part of said thermometer, said probe cover comprising:

a support means including a substantially rigid member to be held in position at a probe side that is opposite to said window; and a plant stretchable film extending over said support means to envelop adjacent parts of said probe when said cover is in place on said probe allowing transmission of radiation from said body through said film to said probe;

wherein said film is circumferentially corrugated prior to the cover being in place and the corrugations are substantially flattened when the cover is in place.

2. The probe cover as defined in claim 1, wherein the circumferential corrugations are limited to portions of the film other than that portion which directly allows transmission of radiation from said body to said probe.

3. A probe cover for use with an infrared thermometer comprising a probe having a tip to be placed adjacent a body, said tip comprising a window to receive radiation for measuring the temperature of the body, said probe cover being adapted to substantially prevent contact between the body and said probe while allowing radiation to be transmitted through said window to a sensor forming part of said thermometer, said probe cover comprising:

a support means including a substantially rigid member to be held in position at a probe side that is opposite to said window; and a pliant stretchable film extending over said support means to envelop adjacent parts of said probe when said cover is in place on said probe allowing transmission of radiation from said body through said film to said probe;

wherein said support means is a clip for attaching said probe cover to the body.

4. The probe cover as defined in claim 3, wherein said support means includes an insert for providing support for said film.

5. The probe cover as defined in claim 4, wherein said support means includes at least one lock for retaining said insert.

* * * * *

UNITED STATES PATENT AND TRADEMARK OFFICE
CERTIFICATE OF CORRECTION

PATENT NO. : 6,152,596
DATED : November 28, 2000
INVENTOR(S) : Jacob Fraden

It is certified that error appears in the above-identified patent and that said Letters Patent is hereby corrected as shown below:

<u>Column 6, claim 1,</u>
Line 1, change "plant" to -- pliant --.

Signed and Sealed this

Twenty-third Day of October, 2001

Attest:

*Attesting Officer*

NICHOLAS P. GODICI
*Acting Director of the United States Patent and Trademark Office*